United States Patent [19]

Tucker

[11] Patent Number: 5,692,711
[45] Date of Patent: Dec. 2, 1997

[54] VEHICLE ARM REST APPARATUS

[76] Inventor: Larry Owen Tucker, 654 Jefferson Ave., Chula Vista, Calif. 91910

[21] Appl. No.: 592,972
[22] Filed: Jan. 29, 1996
[51] Int. Cl.[6] ................................................ B68G 5/00
[52] U.S. Cl. .................. 248/118; 296/153; 297/411.22; 297/411.23
[58] Field of Search .................. 248/118; 296/153; 297/411.21, 411.22, 411.23, 411.46, 411.45

[56] References Cited

U.S. PATENT DOCUMENTS

| | | | |
|---|---|---|---|
| 2,789,862 | 4/1957 | Boyer | 296/153 |
| 3,123,403 | 3/1964 | Hood | 297/411.21 |
| 4,810,026 | 3/1989 | Doane | 296/153 |
| 5,332,288 | 7/1994 | Coates | 296/153 X |
| 5,527,084 | 6/1996 | Scherf | 296/153 |

*Primary Examiner*—Ramon O. Ramirez

[57] ABSTRACT

A vehicle arm rest apparatus including an arm rest having a generally rectangular configuration. The arm rest has foam rubber padding disposed therein. The arm rest has an arcuate recess formed in a lower end thereof. The lower end is positionable on an existing arm rest of a vehicle and having means for securement thereto.

1 Claim, 3 Drawing Sheets

VEHICLE ARM REST APPARATUS

BACKGROUND OF THE INVENTION

1. Field of the Invention

The present invention relates to a vehicle arm rest apparatus and more particularly pertains to coupling to an existing arm rest for providing a more comfortable arm rest with a vehicle arm rest apparatus.

2. Description of the Prior Art

The use of arm rest devices is known in the prior art. More specifically, arm rest devices heretofore devised and utilized for the purpose of suspending from automobile windows for an arm to rest are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,320,401 to Ott discloses a vehicle arm rest.

U.S. Pat. No. 5,205,606 to Cassese discloses an armrest for a window of a modern day motor vehicle.

U.S. Pat. No. 4,810,026 to Doane discloses vehicle arm rest.

U.S. Pat. No. 4,890,878 to Harary et al. discloses a vehicular armrest.

U.S. Pat. No. 4,730,867 to Cluba discloses a vehicle arm rest.

U.S. Pat. No. 4,146,159 to Hemmen discloses a slidable automobile storage arm rest.

While these devices fulfill their respective, particular objective and requirements, the aforementioned patents do not describe a vehicle arm rest apparatus for coupling to an existing arm rest for providing a more comfortable arm rest.

In this respect, the vehicle arm rest apparatus according to the present invention substantially departs from the conventional concepts and designs of the prior art, and in doing so provides an apparatus primarily developed for the purpose of coupling to an existing arm rest for providing a more comfortable arm rest.

Therefore, it can be appreciated that there exists a continuing need for new and improved vehicle arm rest apparatus which can be used for coupling to an existing arm rest for providing a more comfortable arm rest. In this regard, the present invention substantially fulfills this need.

SUMMARY OF THE INVENTION

In the view of the foregoing disadvantages inherent in the known types of arm rest devices now present in the prior art, the present invention provides an improved vehicle arm rest apparatus. As such, the general purpose of the present invention, which will be described subsequently in greater detail, is to provide a new and improved vehicle arm rest apparatus and method which has all the advantages of the prior art and none of the disadvantages.

To attain this, the present invention essentially comprises an arm rest having a generally rectangular configuration. The arm rest has foam rubber padding disposed therein. The arm rest has an upper end, a lower end, a back end, a front end, and two side ends. The lower end has an arcuate recess formed therein. The two side ends have inclined upper ends. The back end has a pair of pile type fasteners disposed thereon. The pair of pile type fasteners are disposed in a middle section of the back end. The lower end is positionable on an existing arm rest of a vehicle. The device includes a pair of adhesive backed pile type fasteners each having a peel away protective layer disposed over the adhesive. The pair of adhesive backed pile type fasteners are secured to a door of a vehicle upwardly of the existing arm rest thereof for coupling with the pair of pile type fasteners on the back end of the arm rest.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle arm rest apparatus which has all the advantages of the prior art arm rest devices and none of the disadvantages.

It is another object of the present invention to provide a new and improved vehicle arm rest apparatus which may be easily and efficiently manufactured and marketed.

It is a further object of the present invention to provide a new and improved vehicle arm rest apparatus which is of durable and reliable construction.

An even further object of the present invention is to provide a new and improved vehicle arm rest apparatus which is susceptible of a low cost of manufacture with regard to both materials and labor, and which accordingly is then susceptible of low prices of sale to the consuming public, thereby making such a vehicle arm rest apparatus economically available to the buying public.

Still yet another object of the present invention is to provide a new and improved vehicle arm rest apparatus which provides in the apparatuses and methods of the prior art some of the advantages thereof, while simultaneously overcoming some of the disadvantages normally associated therewith.

Even still another object of the present invention is to provide a new and improved vehicle arm rest apparatus for coupling to an existing arm rest for providing a more comfortable arm rest.

Lastly, it is an object of the present invention to provide a new and improved vehicle arm rest apparatus including an arm rest having a generally rectangular configuration. The arm rest has foam rubber padding disposed therein. The arm rest has an arcuate recess formed in a lower end thereof. The lower end is positionable on an existing arm rest of a vehicle and having means for securement thereto.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description reference to the annexed drawings wherein.

The same reference numerals refer to the same parts through the various Figures.

DESCRIPTION OF THE PREFERRED EMBODIMENT

Figure 1:
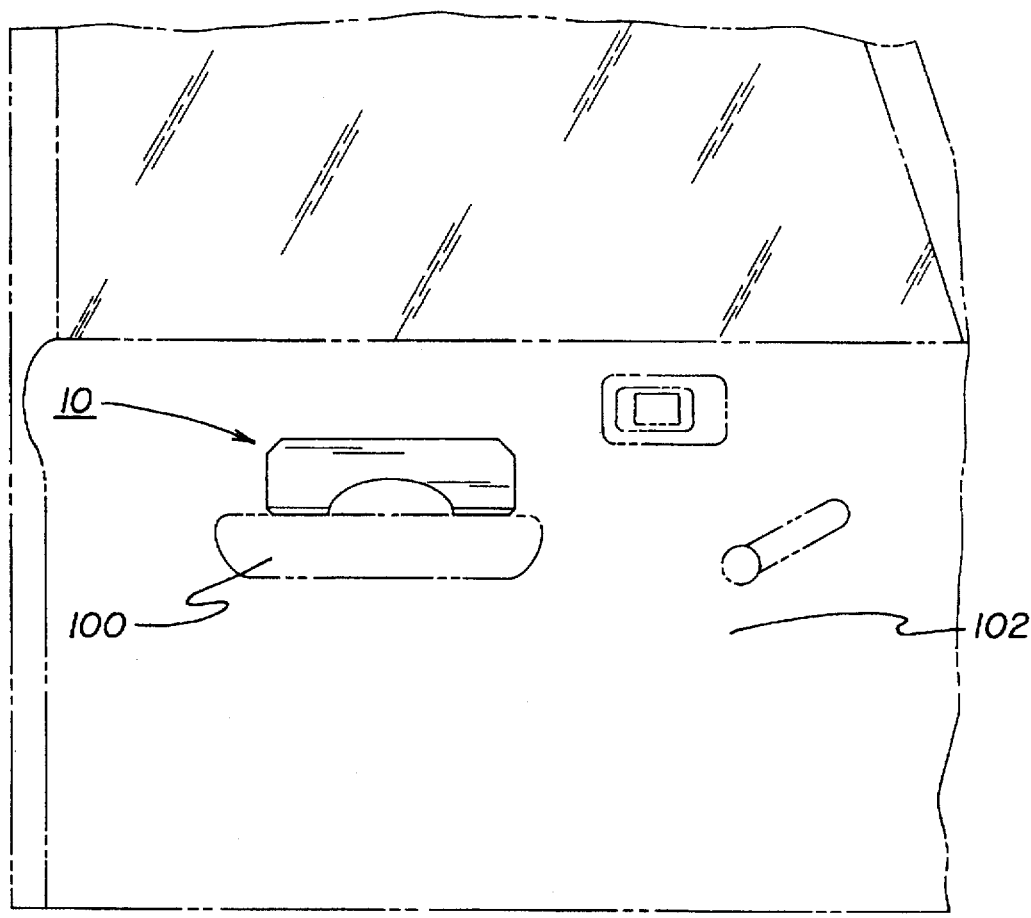
FIG. 1 is a perspective view of the preferred embodiment of the vehicle arm rest apparatus constructed in accordance with principles of the present invention.
Figure 2:
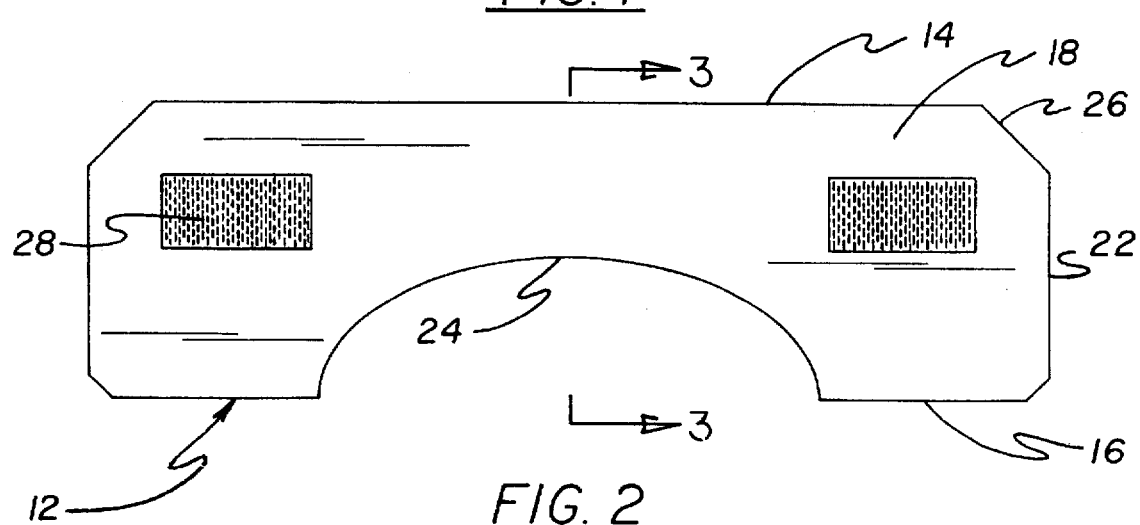
FIG. 2 is a front elevation view of the present invention.
Figure 3:
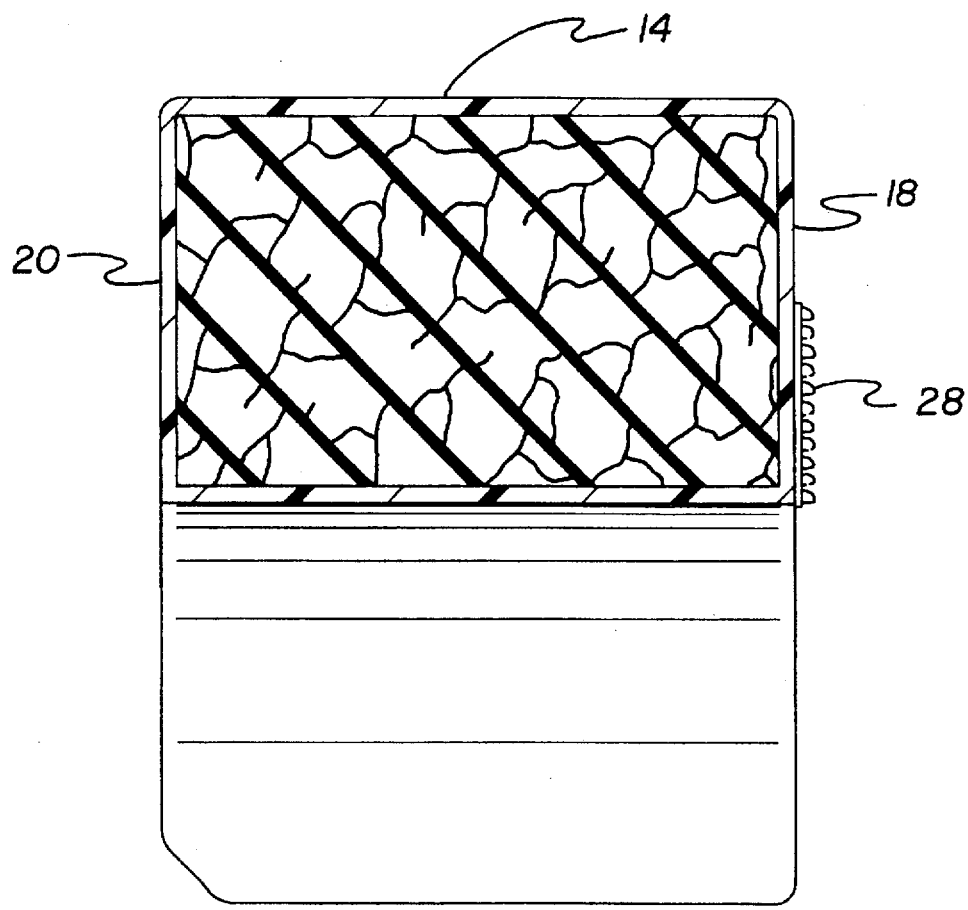
FIG. 3 is a cross-sectional view as taken along line 3—3 of FIG. 2.
Figure 4:
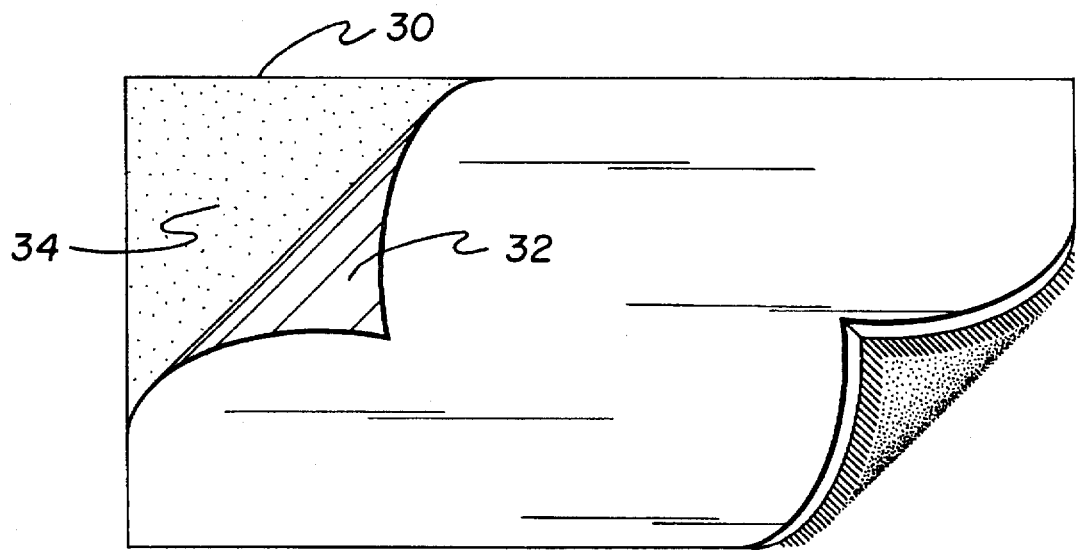
FIG. 4 is a plan view of the adhesive backed pile type fastener of the present invention.
Figure 5:
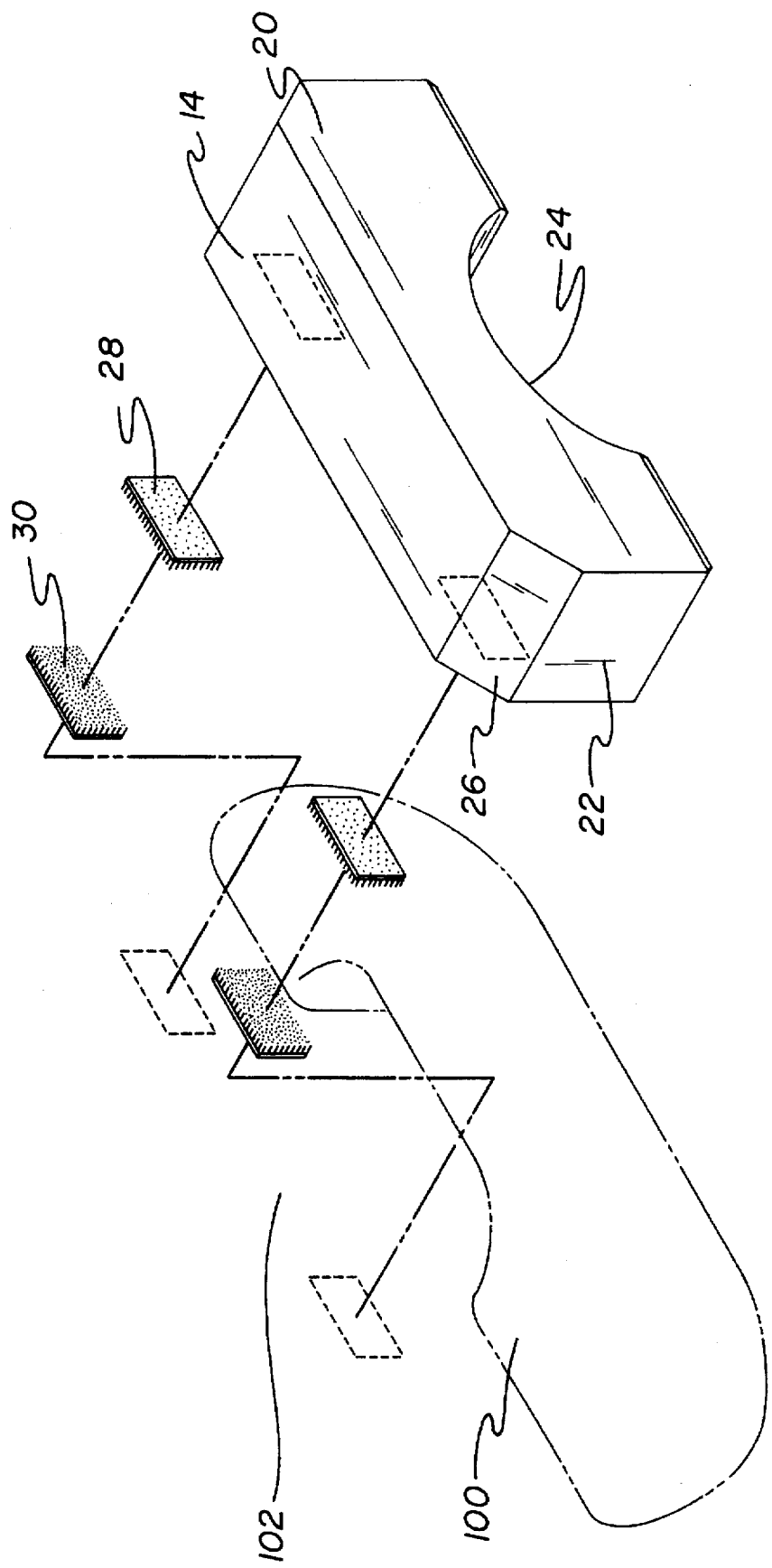
FIG. 5 is a perspective view as secured to an automobile door.

With reference now to the drawings, and in particular, to Figure's 1-5 thereof, the preferred embodiment of the new and improved vehicle arm rest apparatus embodying the principles and concepts of the present invention and generally designated by the reference number 10 will be described.

Specifically, it will be noted in the various Figures that the device relates to a new and improved vehicle arm rest apparatus for coupling to an existing arm rest for providing a more comfortable arm rest. In its broadest context, the device consists of an arm rest and a pair of adhesive backed pile type fasteners. Such components are individually configured and correlated with respect to each other so as to attain the desired objective.

The device 10 includes an arm rest 12 having a generally rectangular configuration. The arm rest 12 has foam rubber padding 14 disposed therein. The arm rest 12 has an upper end 14, a lower end 16, a back end 18, a front end 20, and two side ends 22. The lower end 16 has an arcuate recess 24 formed therein. The two side ends 22 have inclined upper ends 26. The back end 18 has a pair of pile type fasteners 28 disposed thereon. The pair of pile type fasteners 28 are disposed in a middle section of the back end 18. The lower end 16 is positionable on an existing arm rest 100 of a vehicle. The lower end 16 is positioned on the existing arm rest 100 with the arcuate recess 24 disposed over the hand gripping portion of the existing arm rest 100 thereby allowing a user to continue to be able to grab the gripping portion with their hand to close the vehicle door 102.

The device 10 includes a pair of adhesive backed pile type fasteners 30 each having a peel away protective layer 32 disposed over the adhesive 34. The pair of adhesive backed pile type fasteners 30 are secured to the door 102 of a vehicle upwardly of the existing arm rest 100 thereof for coupling with the pair of pile type fasteners 28 on the back end 18 of the arm rest 12. The user simply peels away the protective layer 32 to expose the adhesive 34. The fasteners 30 are then secured to the door 102 above the existing arm rest 100. The arm rest 12 is then placed on the existing arm rest 100 with the pile type fasteners 28 coupled with the fasteners 30 on the door 100. The pile type fasteners 28 are positioned in a middle section of the back end 18 to allow for the arm rest 12 to shift slightly when the user's arm is placed there.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A vehicle arm rest apparatus for coupling to an existing arm rest for providing a more comfortable arm rest comprising, in combination:

a car door having a permanent arm rest;

an arm rest having a generally rectangular configuration, the arm rest having foam rubber padding disposed therein, the arm rest having an upper end, a lower end, a back end, a front end, and two side ends, the lower end having an arcuate recess formed therein, the two side ends having inclined upper ends, the back end having a pair of pile type fasteners disposed thereon, the pair of pile type fasteners being disposed in a middle section of the back end, the lower end positionable on the permanent arm rest of the car door whereby a user's hand can pass below the arcuate recess so as to grasp the permanent arm rest manipulate the car door;

a pair of adhesive backed pile type fasteners each having a peel away protective layer disposed over the adhesive, the pair of adhesive backed pile type fasteners secured to the car door upwardly of the permanent arm rest thereof for removable coupling with the pair of pile type fasteners on the back end of the arm rest.

* * * * *